(12) United States Patent
Tahhan et al.

(10) Patent No.: US 11,729,044 B2
(45) Date of Patent: Aug. 15, 2023

(54) SERVICE RESILIENCY USING A RECOVERY CONTROLLER

(71) Applicant: Intel Corporation, Santa Clara, CA (US)

(72) Inventors: Maryam Tahhan, Limerick (IE); Shobhi Jain, Shannon (IE); John J. Browne, Limerick (IE); Emma L. Foley, Killorglin (IE); John O'Loughlin, Shannon (IE); Sunku Ranganath, Beaverton, OR (US); Krzysztof Kepka, Gdansk (PL); Swati Sehgal, Shannon (IE)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 17/079,238

(22) Filed: Oct. 23, 2020

(65) Prior Publication Data

US 2021/0111942 A1    Apr. 15, 2021

Related U.S. Application Data

(60) Provisional application No. 62/927,609, filed on Oct. 29, 2019.

(51) Int. Cl.
*H04L 41/0604* (2022.01)
*H04L 41/5003* (2022.01)
*H04L 41/069* (2022.01)
*H04L 41/0631* (2022.01)

(52) U.S. Cl.
CPC ........ *H04L 41/0627* (2013.01); *H04L 41/069* (2013.01); *H04L 41/0645* (2013.01); *H04L 41/5003* (2013.01)

(58) Field of Classification Search
None
See application file for complete search history.

(56) References Cited

U.S. PATENT DOCUMENTS 9,239,717 B1 * 1/2016 AlSaeed ................... G06F 8/65

OTHER PUBLICATIONS

ETSI GS NFV-MAN 001 v1.1.1, "Network Functions Virtualization (NFV); Management and Orchestration", Group Specification, Dec. 2014, 184 pages.

(Continued)

*Primary Examiner* — Brian Whipple
(74) *Attorney, Agent, or Firm* — Compass IP Law PC

(57) ABSTRACT

Examples described herein relate to a management system that determines which services to redeploy on one or more platforms. A platform can receive a configuration to perform during a failure of connectivity with a management system. The platform can monitor activity of one or more services. The platform can, based on failure of connectivity with the management system and recovery of connectivity with the management system, provide the monitored activity of one or more services to the management system to influence services re-deployed by the management system. In some examples, based on failure to re-establish a connection with the management system within an amount of time, the platform can connect with the management system using a secondary management interface.

28 Claims, 14 Drawing Sheets

(56) References Cited

OTHER PUBLICATIONS

Ponemon Institute, "Cost of Data Center Outages Jan. 2016 Data Center Performance Benchmark Series", Emerson, Jan. 2016, 21 pages.

Spirent Communications, "Heavy Reading Report Finds Congestion and Network Failures are Growing Causes of Mobile Network Outages and Service Degradations", CISION PR Newswire, https://www.pmewswire.com/news-releases/heavy-reading-report-finds-congestion-and-network-failures-are-growing-causes-of-mobile-network-outages-and-service-degradations-300223163.html, Feb. 2016, 3 pages.

* cited by examiner

SERVICE RESILIENCY USING A RECOVERY CONTROLLER

RELATED APPLICATION

This application claims the benefit of priority of U.S. Provisional application 62/927,609, filed Oct. 29, 2019. The contents of that application is incorporated in its entirety herein.

DESCRIPTION

Each year, a typical mobile operator experiences multiple network outages or service deteriorations, or one every other month. Taken together, these incidents potentially account for $15 billion in losses, despite operators' earnest efforts to address problems. Most telecommunication providers spend between 1.5 and 5 percent of their annual revenue fixing network issues. The primary causes of outages include congestion, physical link failures, overloading and network equipment failure. The problem of recovering management of the platform and network function virtualization (NFV) service on the platform while minimizing downtime needs to be addressed for NFV.

DETAILED DESCRIPTION

Figure 1:
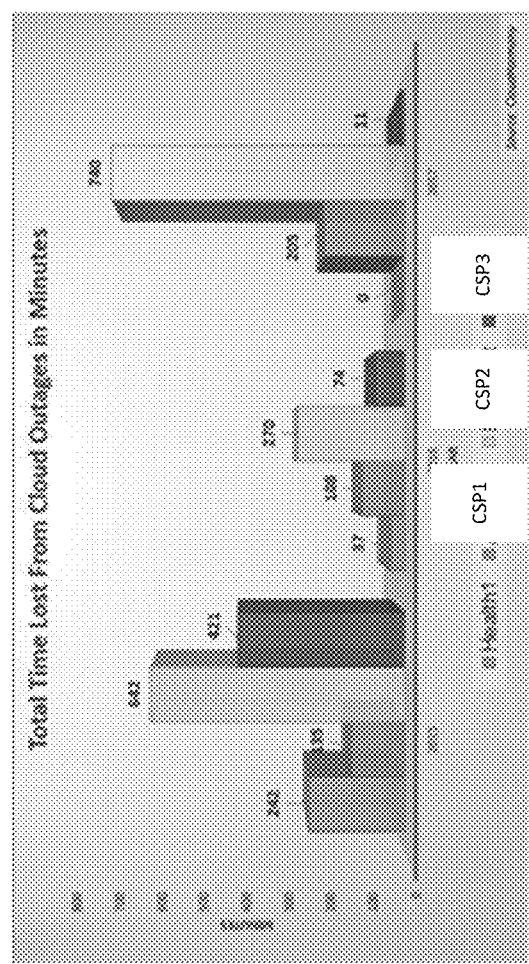
FIG. 1 shows a chart showing various cloud service provider (CSP) cloud outages.

Open Source Mano is a European Telecommunications Standards Institute (ETSI)-hosted initiative to develop an Open Source NFV Management and Orchestration (MANO) software stack aligned with ETSI NFV. Examples of MANO include Open Source MANO (OSM) or Open Network Automation Platform (ONAP). MANO provides Operations Support Systems (OSS) and Business Support Systems (BSS). MANO can handle execution of policies and virtualized network function (VNF) onboarding. MANO can use a management stack in conjunction with Analytics and Elements Management Systems (EMS) to detect and correct hardware issues.

A Virtualized Infrastructure Manager (VIM) (e.g., Kubernetes) can control and manage Network Functions Virtualization Infrastructure (NFVI) compute, storage, and network resources. A VNF manager (VNFM) (e.g., DOCKER) can be used by a VIM to deploy containers. A VNF manager can oversee lifecycle management of VNF instances. A VNF manager can manage coordination and adaptation for configuration and event reporting between NFVI and E/NMS (Network Management Software). A management system can inform a recovery controller of VNF deployments and life cycle changes (e.g., VNFs added or removed from the platform). A managing recovery controller can select and deploy Recovery Policy, Fault policy, VNF policy and NFVI policy to the recovery controller to match the SLAs of the VNFs selected and deployed to the platform.

Currently, after recovery from an outage of the management systems, orchestration systems (e.g., OpenStack and Kubernetes) attempt to re-deploy NFV applications regardless of the actual running state of the NFV services. This causes interruption of the services provided by the applications and causes a second unplanned outage after the initial outage of the management systems. In some examples, after a management system (e.g., MANO) recovers from an outage, it goes into a redeployment phase and MANO attempts to re-deploy all NFV services regardless of the actual running state of the NFV services. After recovery, MANO redeploys all services, including critical applications (e.g., evolved packet core (EPC)) that redeploy whether or not the service is operational or functional. This causes further outages, as each service can experience interruption while its VNFs are being re-deployed.

Some MANO systems treat services deployment as if a service is starting for the first time. Some MANO systems do not support the "restart" capabilities, and cannot retrieve state after a system outage, and will always provision services as if for a green field (new) deployment, instead of being able to inventory services and restart only the necessary ones. Currently, MANO does not allow for survivability during a management outage. If management systems (e.g., MANO) fail, it is important to continue providing the best possible service until the central management is restored again. If this is not done, Communications Service Providers (CSPs) may not be able to meet their advertised feeds, speeds, or service level agreements (SLAs). ONAP and OSM do not have recovery mechanisms as described herein.

In the case of rebooting a Kubernetes controller node, at least two scenarios can occur. If the node downtime is brief, when a Kubelet restarts, it will attempt to restart the pods associated with it or scheduled to it. A default down time is 5 minutes, controlled by a pod-eviction-timeout on the controller-manager. If the node downtime takes longer than 5 minutes, then the node controller can terminate the pods that are bound to the unavailable node.

If there is a corresponding replica set (or replication controller), then a new copy of the pod can be started on a different node. More control over various scenarios (e.g., the upgrading process) can be achieved using kubectl drain to gracefully terminate all pods on the node and mark the node as unschedulable. Kubernetes is configured with an identification of the nodes that are part of the cluster and workloads running on those nodes and hence can handle outages at a cluster level but not at the MANO layer.

In addition, MANO has challenges with scalability. Some NFV systems do not have scalable resiliency to provide local action to handle occurrences or storms of wide-spread faults, which can occur during a natural disaster or denial of service attack. The scalability problem applies to multiple single platforms and disaggregated systems such as, but not limited to, rack scale architecture (RSA) or rack scale design (RSD).

Some high availability (HA) solutions utilize multiple active and standby (ACT-SBY) controller instances and when one controller fails, it fails over to a standby controller. Although standby controllers are activated when an active controller fails, the standby controller attempts to redeploy services from scratch. The state management is often not available in a complex service chain environments using high availability solutions. High availability (HA) solutions have multiple ACT-SBY controller instances, when one controller fails, it fails over to the second one.

FIG. 1 shows a chart showing various cloud service provider (CSP) cloud outages over years 2015-2017. Specifically, total workload time lost from cloud outages in minutes is shown. Various embodiments attempt to increase availability of at least an NFV based service on a platform (e.g., Intel Architecture (IA), ARM, or others), using a remote recovery manager and recovery controller local to the platform that runs NFV services or other services. The local recovery controller can be preloaded with recovery policies and recovery actions. The local recovery controller can continue to operate in the event of a MANO outage. However, the recovery controller could be on a server platform or there could be one recovery controller per physical rack or one per cluster (e.g., Kubernetes cluster). A recovery controller per server may be the most resilient and can distribute recovery in the event of MANO outage including an OpenStack or Kubernetes outage and recovery.

For example, an outage can occur where the orchestration controller is intact, but MANO is inoperative and/or lost contact with the orchestration controller. On restart, various embodiment configure MANO to be able to query and connect to existing services. After a management system recovers from a failure, the recovery controller can at least detect running VNFs and critical services and allows these services to remain active or applies a recovery policy rather than going through a redeployment phase. Various embodiments can help Cloud Service Providers (CSPs) reduce Mean Time To Remediate (MTTR) and Mean Time To Recover (MTTRec) Services in the case of an outage.

Various embodiments can also be applied at VIM level and not just MANO level. For example, various embodiments can be utilized by a Kubernetes cluster where a Main or Master node manages one or more nodes. Other management systems and VIMs can be used such as VMware vSphere, OpenStack, Network Function Virtualization (NFV) orchestrator (e.g., ONAP and OSM). Observability frameworks, such as 3GPP Network Data Analytics Function (NWDAF) or analytics systems can also utilize embodiments to avoid resetting local collection agents when recovering cluster wide monitoring services such as collected.

Figure 2A:
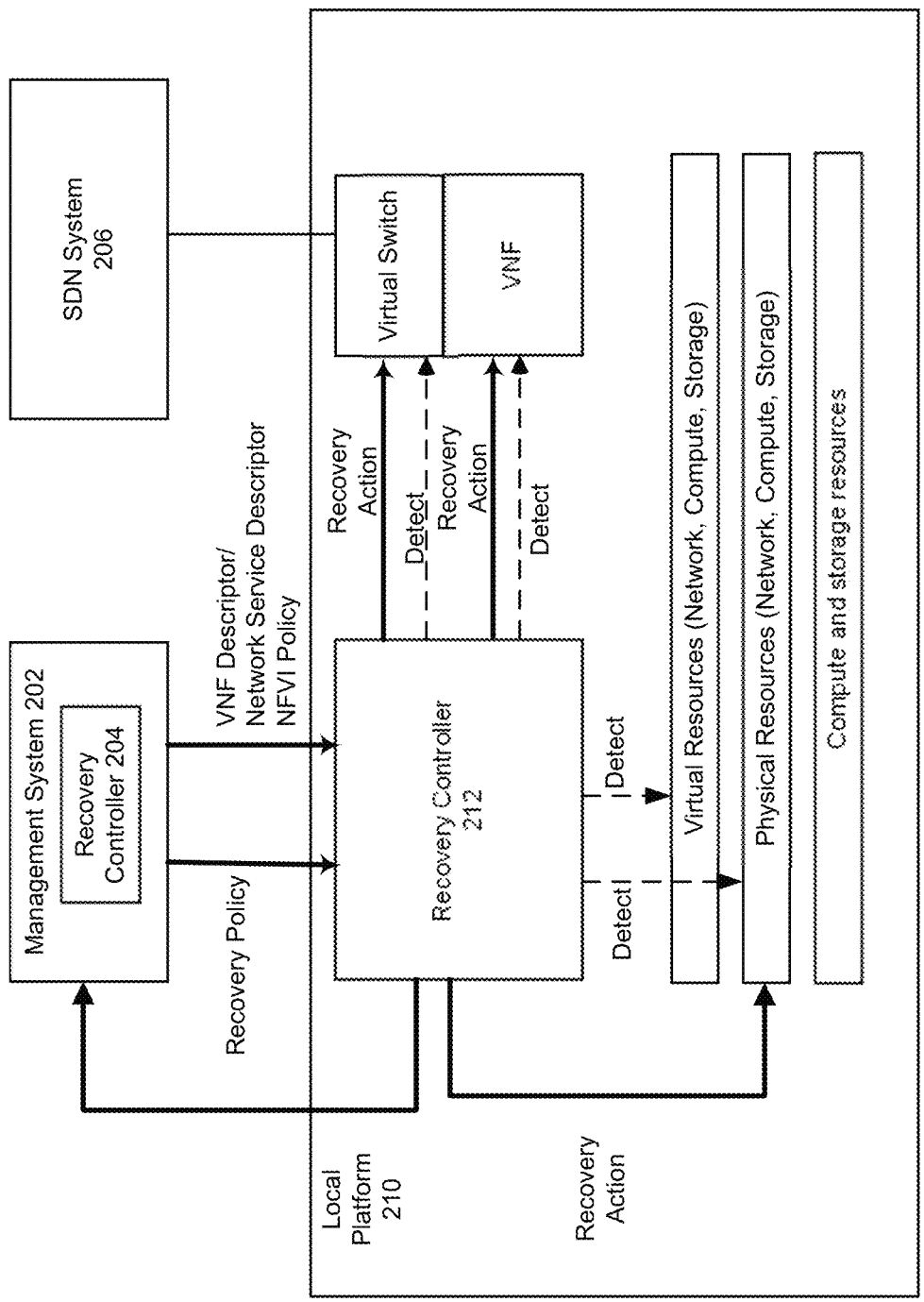
FIG. 2A shows a management system that provides various policies and actions to a recovery controller.

FIG. 2A shows a management system that provides various policies and actions to a recovery controller. In some examples, management system 202 can perform operations compatible with MANO as described at least in "Network Functions Virtualisation (NFV); Management and Orchestration" (ETSI GS NFV-MAN 001 V1.1.1 (2014) and variations and revisions thereof or other observability or management frameworks described herein. Management system 202 can be implemented as an OSM or ONAP running in a background in a datacenter, edge, or fog network element. Management system 202 can execute on one or multiple servers. Management system 202 can keep track of inventory, life cycle management of VNFs, services onboarded through MANO.

Management system 202 can use an NFV Orchestrator that is responsible for on-boarding of new Network Services (NS), and Virtual Network Functions (VNFs), NS lifecycle management, global resource management, validation and authorization of NFVI resource requests. Examples of on-boarding can include adopting any new network function to deploy in the cloud environment.

Management system 202 (e.g., orchestrator) executing on a computing platform and SDN system 206 can communicate with local platform 210 using a network or fabric. For example, a network or fabric can be compatible with: Ethernet (e.g., IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof.

Remote recovery controller 204 can configure local recovery controller 212. In some embodiments, management recovery controller 204 can be an entity (e.g., software and/or hardware) that configures recovery policies and acts as a global recovery controller. Recovery controller 204 can provide or copy (e.g., push) to local recovery controller 212 one or more of: ETSI standard defined recovery policy, VNF descriptor, network service descriptor, NFVI Policy, and other policies. Relative to services performed by local platform 210, local recovery controller 212 can run dedicated operations on a core on the same CPU that includes a core that runs one or more services, run on a separate CPU (socket) in a dual processor system (e.g., connected by QPI or UPI) as a CPU that runs one or more services, or run on another processor on the same server connected by PCIe to the other processor running the VNFs.

Local recovery controller 212 can generate and maintain a topology hardware dependency graph on a per-compute node basis and maintain context and state for one or more compute nodes. Recovery controller 212 can receive and store the Recovery Policy, Fault Policy VNF policy and NFVI policy provided by management system 202 and associate hardware resources to both the NFVI entities (as part of the node deployment) and VNFs deployed as part of the management system life cycle management. Recovery controller 212 can continually monitor fault domains on local platform 210. On recovery, recovery controller 212 can trigger the associated recovery policy action for the associated VNF/NFVI entity (e.g., vSwitch) based on the constraints set by a Fault Policy.

Some implementations of recovery controller 212 can be split between orchestration and platform levels such as splitting responsibility for local platform 210 between a MANO and local agents. A local platform agent (e.g., a local software process (or hardware component) that includes recovery controller 212) could run headless (e.g., without MANO in the case of a MANO or management outage), allowing local platform 210 to remediate and recover without management system 202 based on the provided policies if required. A local platform agent could continue normal operation if there are no issues. Once a management system (e.g., MANO) comes back online, the local agent could update the MANO on status and allow it to make informed decisions about the need to redeploy VNFs. This local agent could also be part of SDN controller 206.

In a case of centralized management failures, whole network failure can be avoided as the managed network elements can continue to operate with appropriate policies and actions by on-platform resiliency component (e.g., recovery controller 212). The platform may also be configured with secondary or backup MANO interfaces should the primary MANO (e.g., management system 202) fail (e.g., using a different virtual or physical network port).

Local platform 210 can include a server, rack of multiple servers, multiple racks of servers, or other computing devices. Local platform 210 can include one or more processors, memory resources, and network resources. Local platform 210 can execute services. In some examples, local platform can include one or more of: a core, graphics processing unit (GPU), field programmable gate array (FPGA), or application specific integrated circuit (ASIC). In some examples, a core can be sold or designed by Intel®, ARM®, AMD®, Qualcomm®, IBM®, Texas Instruments®, among others. Any processor can execute an operating system, driver, applications, and/or a virtualized execution environment (VEE) (e.g., virtual machine or container). In some examples, an operating system (OS) can be Linux®, Windows®, FreeBSD®, Android®, MacOS®, iOS®, or any other operating system.

Various embodiments can enable service specific fail-safe behavior on a platform, which can prevent downstream chatter and enable faster system recovery by putting platforms and services in good recoverable states. Immediate applications of management policies or remediation of failures within time frames can be achieved that meet telecommunication company (telco) or other customer requirements. Various embodiments attempt to reduce service down time and can provide rapid application of VNF management policies. Immediate applications of management policies or remediation of failures within time frames can be helpful when an operator wishes to outsource aspects of its OSS/BSS into a cloud domain.

Figure 2B:
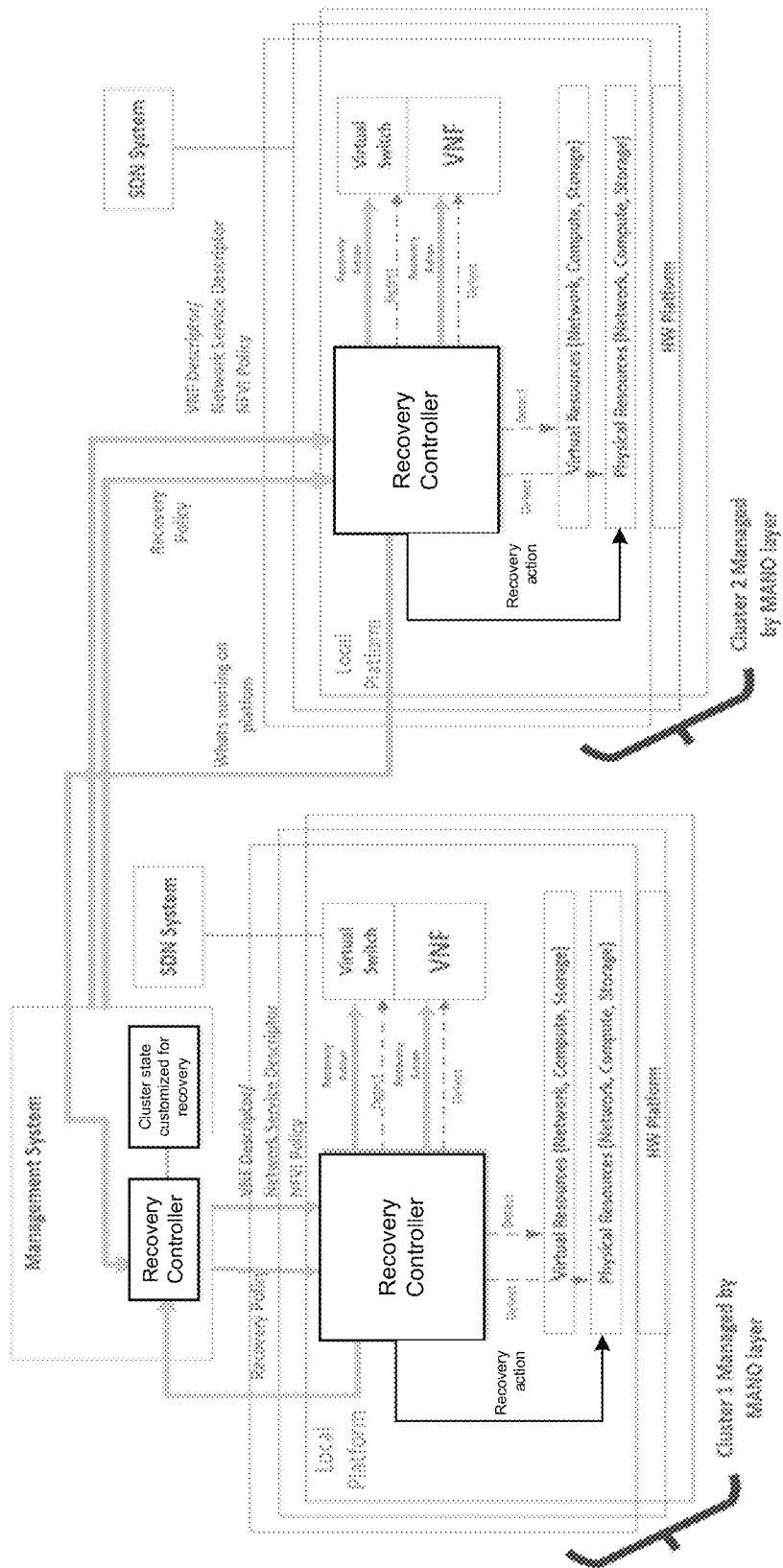
FIG. 2B shows another example system. In this example, a management system can manage multiple local platforms.

FIG. 2B shows another example system. In this example, a management system can manage multiple local platforms. For example, management system 202 can manage multiple platforms where each platform uses a recovery controller.

Figure 2C:
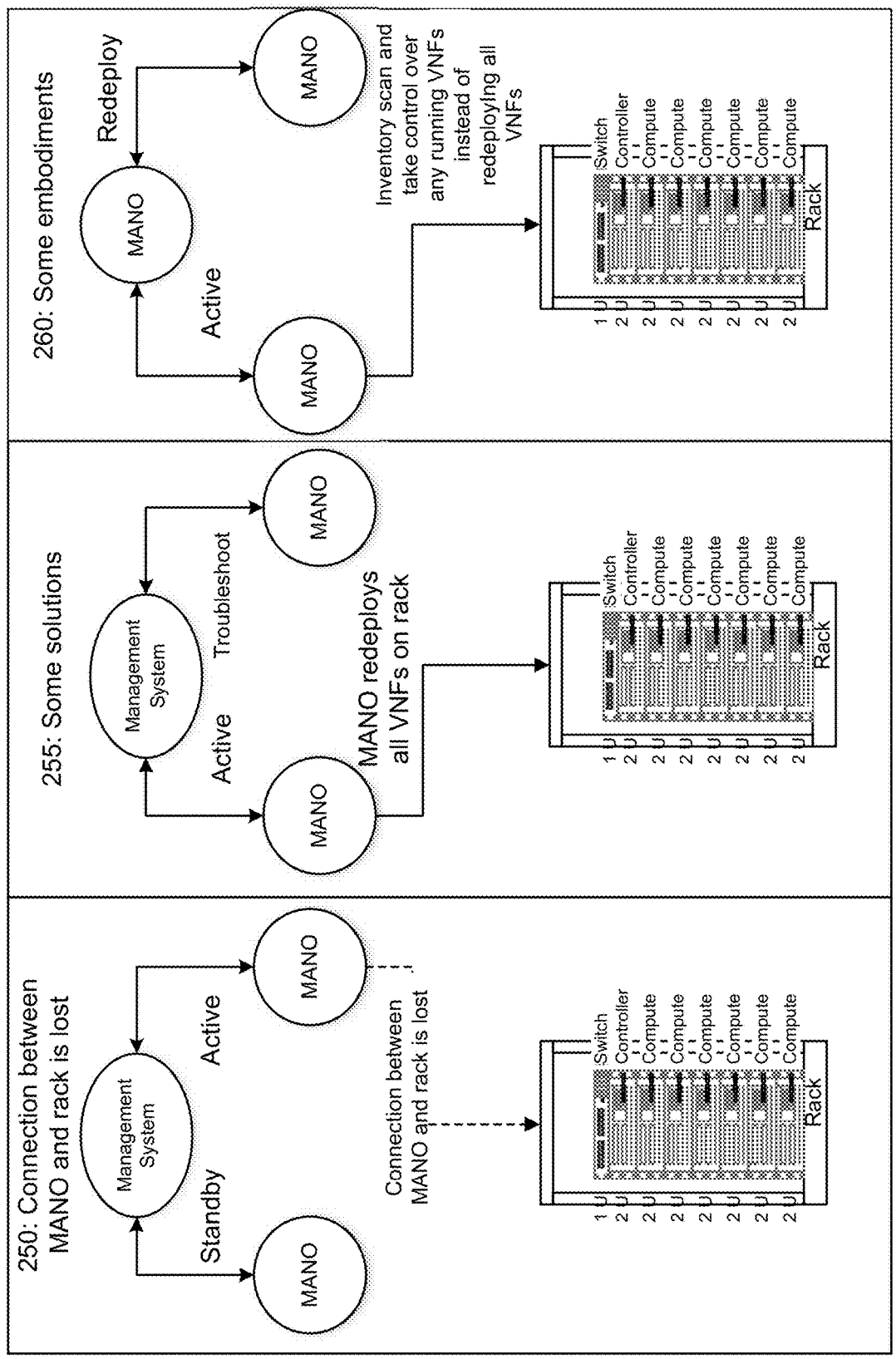
FIG. 2C shows a comparison between some solutions and various embodiments after a connection is lost and a connection is resumed.

FIG. 2C shows a comparison between some solutions and various embodiments after a connection is lost and a connection is resumed. At 250, a connection between a MANO and a rack or other platform is lost. At 255, some solutions provide for redeploying all VNFs and other services on a rack or platform as though a new deployment at the rack or platform. At 260, various embodiments provide that a management system (e.g., MANO) redeploy merely failed services and permitting operating services to continue to operate, instead of redeploying all services running on a platform.

Figure 3A:
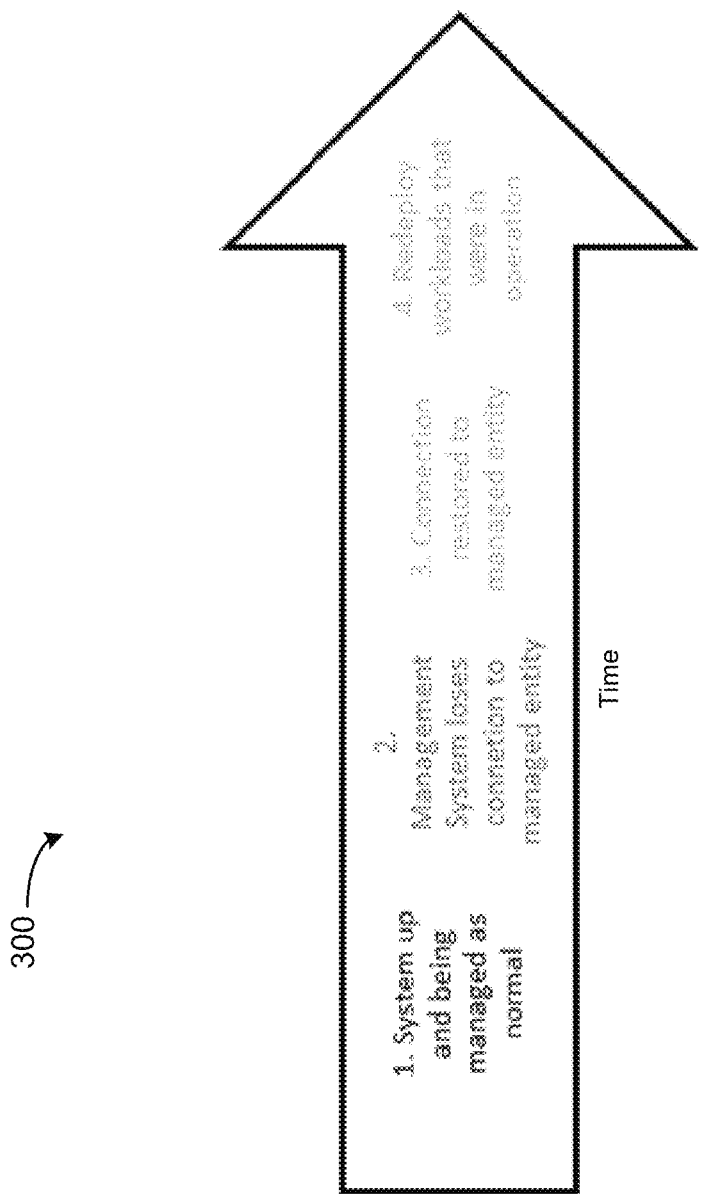
FIG. 3A shows an example recovery process if there is a network outage.

FIG. 3A shows an example recovery process if there is a network outage. In process 300, a management system such as MANO assumes that entities it is managing (e.g., both physical and virtual) are in unknown states and redeploys them in order to resume service. This can be a lengthy processes (depending on how many nodes and VNFs are being managed), and causes service interruption for (potentially) operational nodes/VNFs that did not need to be redeployed. In some examples, an initial deployment is the same as a re-start of the MANO system.

Figure 3B:
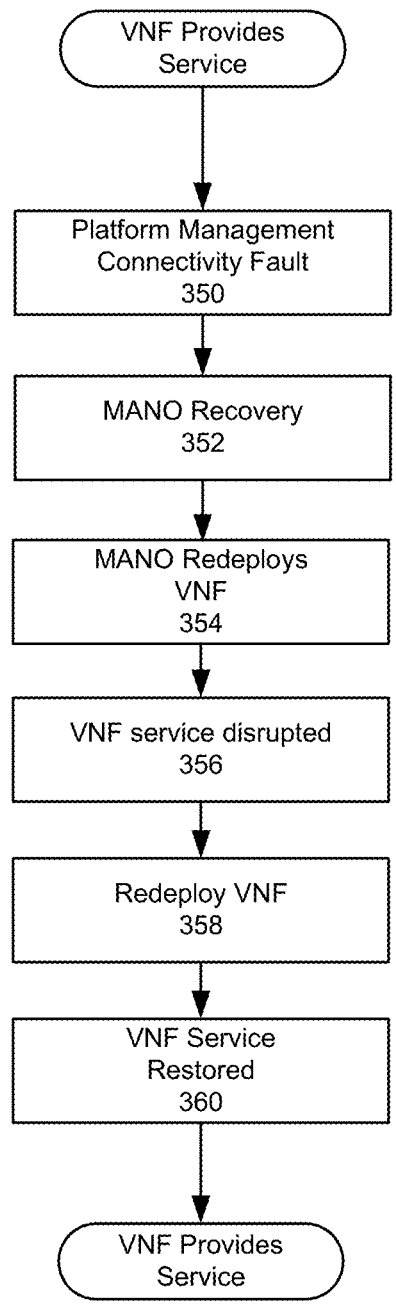
FIG. 3B shows an example operation of a VNF as a result of a platform management connectivity fault.

FIG. 3B shows an example operation of a VNF as a result of a platform management connectivity fault. At 350, a platform management connectivity fault can be detected such as loss of a heart beat from a management system. At 352, a MANO recovery operation can take place to provide a recovered or substitute MANO to manage a platform. At 354, the recovered or substitute MANO can redeploy all VNFs running on the platform. At 356, the VNF experiences service disruption as a result of being redeployed and intermediate work product can be lost. At 358, the VNF can be redeployed on the platform. At 360, VNF service can be restored after being redeployed.

Figure 4:
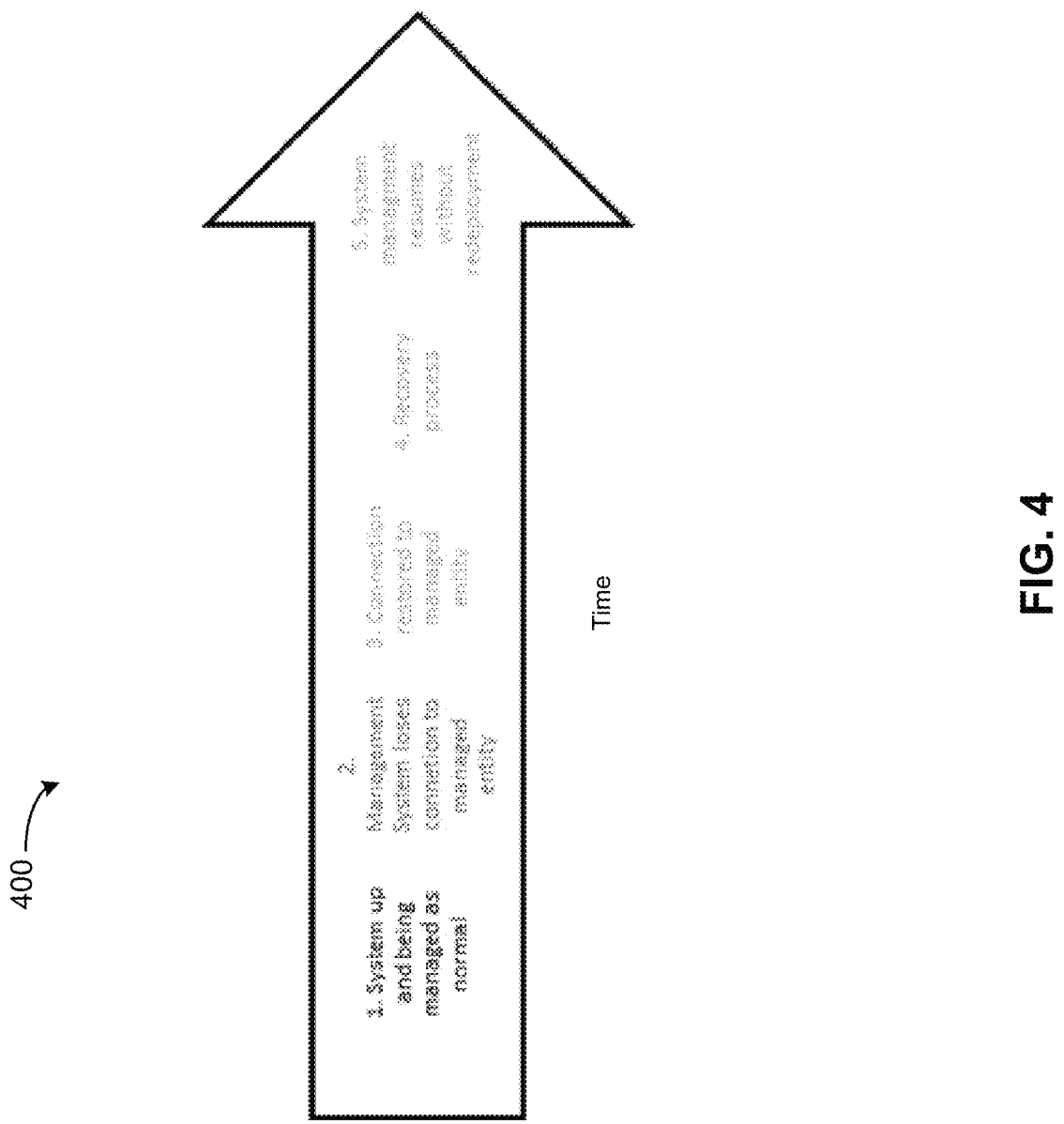
FIG. 4 depicts an example process.

FIG. 4 shows an example recovery process according to various embodiments for a network outage between a management system and managed entities. In process 400, a management system such as MANO can use a recovery controller (e.g., between MANO and a local agent running on the node) to perform recovery checks based on recovery policies to check the state of a node and services (e.g., VNFs) running on the node. A local controller (e.g., local to the node) starts running the relevant checks as soon as connection to MANO is lost and monitors the state of the node and services. When the connection is restored, the local controller can communicate a state of the managed entities and the platform when queried by the MANO recovery controller so as not to flood or overwhelm MANO as soon as a connection is restored. Services can continue operation without any service disruption as MANO is now aware of their state and does not need to redeploy such services.

Figure 5:
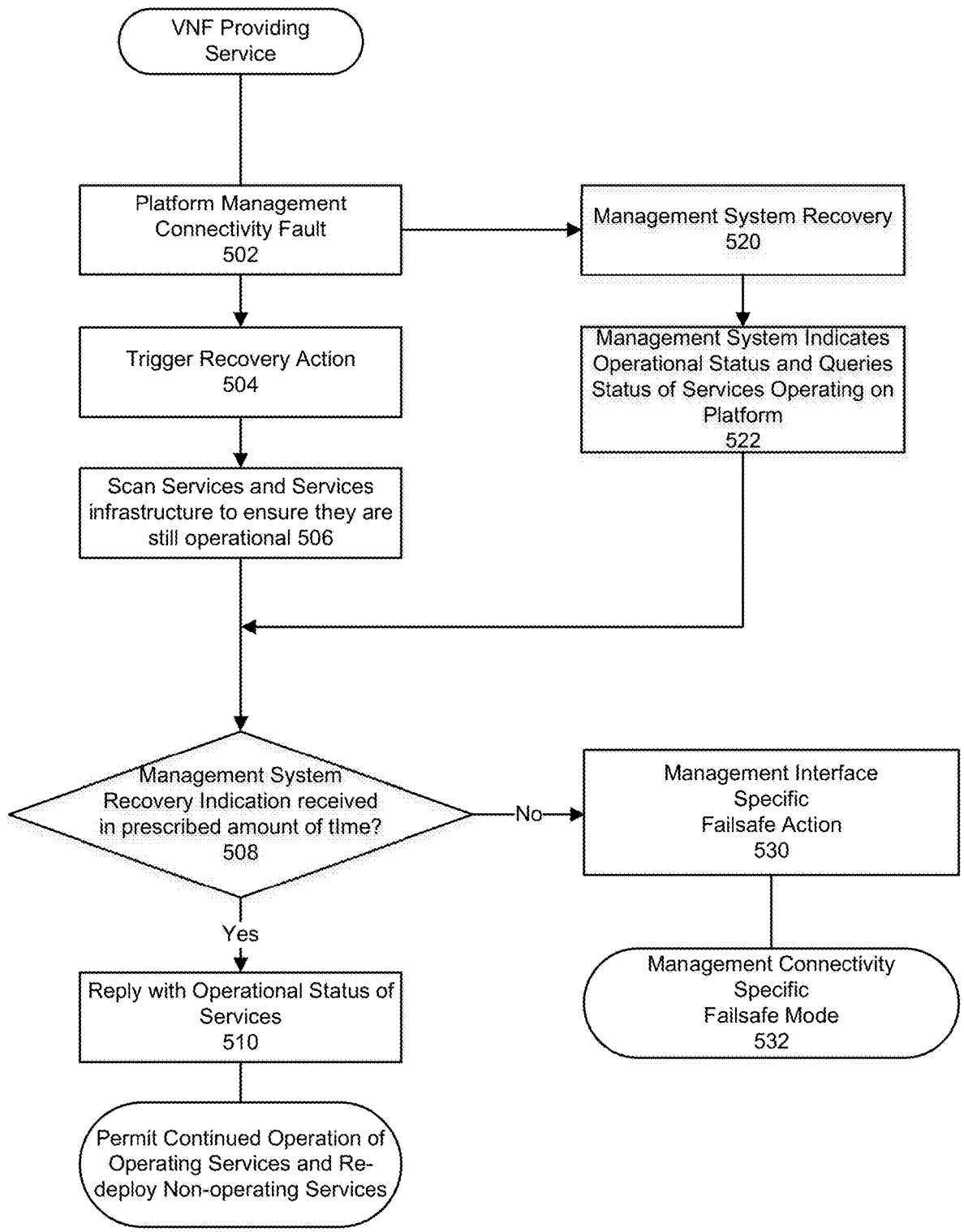
FIG. 5 shows an example recovery process.

FIG. 5 shows an example recovery process. In some examples, a platform can have one or more services operating on a local server or computing platform. A service can include any microservice, cloud native microservice, workload, software, application, hardware, accelerator, CPU, GPU, or other device. For example, a service can perform packet processing based on one or more of Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Some services can perform video processing or media transcoding (e.g., changing the encoding of audio, image or video files).

At 502, a networking connectivity fault is detected. For example, a networking connectivity fault can be detected if a local recovery controller picks up lack of communication with MANO (e.g., misses heartbeat from remote local recovery controller or networking fault on management interface going to local platform from physical switch (e.g., link failure or wire disconnected)). For example, connectivity fault can occur if a platform is unable to communicate with an active management system (e.g., MANO, SDN Controller, or analytics reporting). For example, analytics reporting can refer to an identification of a level of traffic between a management network over which MANO communicates with a server and if traffic on the management network stops or is significantly reduced, the MANO, network, or server could be identified to be malfunctioning. The process continues to 504 and 520.

For Intel Architecture, an example list of faults could include can be as follows. Integrated Memory Controller Machine Check Errors:

"Address parity error",
"HA write data parity error",
"HA write byte enable parity error",
"Corrected patrol scrub error",
"Uncorrected patrol scrub error",
"Corrected spare error",
"Uncorrected spare error",
"Any HA read error",
"WDB read parity error",
"DDR4 command address parity error",
"Uncorrected address parity error"
"Unrecognized request type",
"Read response to an invalid scoreboard entry",
"Unexpected read response",
"DDR4 completion to an invalid scoreboard entry",
"Completion to an invalid scoreboard entry",
"Completion FIFO overflow",
"Correctable parity error",
"Uncorrectable error",
"Interrupt received while outstanding interrupt was not ACKed",
"ERID FIFO overflow",
"Error on Write credits",
"Error on Read credits",
"Scheduler error",
"Error event",
"MscodDatandErr",
"Reserved",
"MscodPtlWrErr",
"MscodFullWrErr",
"MscodBgfErr",
"MscodTimeout",
"MscodParErr",
"MscodBucket1Err"
Interconnect (QPI) Machine Check Errors:
  "UC Phy Initialization Failure",
  "UC Phy detected drift buffer alarm",
  "UC Phy detected latency buffer rollover",
  "UC LL Rx detected CRC error: unsuccessful LLR: entered abort state",
  "UC LL Rx unsupported or undefined packet",
  "UC LL or Phy control error",
  "UC LL Rx parameter exchange exception",
  "UC LL detected control error from the link-mesh interface",
  "COR Phy initialization abort",
  "COR Phy reset",
  "COR Phy lane failure, recovery in x8 width",
  "COR Phy L0c error corrected without Phy reset",
  "COR Phy L0c error triggering Phy Reset",
  "COR Phy L0p exit error corrected with Phy reset",
  "COR LL Rx detected CRC error—successful LLR without Phy Reinit",
  "COR LL Rx detected CRC error—successful LLR with Phy Reinit"
  "Phy Control Error",
  "Unexpected Retry.Ack flit",
  "Unexpected Retry.Req flit",
  "RF parity error",
  "Routeback Table error",
  "unexpected Tx Protocol flit (EOP, Header or Data)",
  "Rx Header-or-Credit BGF credit overflow/underflow",
  "Link Layer Reset still in progress when Phy enters L0",
  "Link Layer reset initiated while protocol traffic not idle",
  "Link Layer Tx Parity Error"
Internal Machine Check Errors:
  "No Error",
  "MCA_DMI_TRAINING_TIMEOUT",
  "MCA_DMI_CPU_RESET_ACK_TIMEOUT",
  "MCA_MORE_THAN_ONE_LT_AGENT",
  "MCA_BIOS_RST_CPL_INVALID_SEQ",
  "MCA_BIOS_INVALID_PKG_STATE_CONFIG",
  "MCA_MESSAGE_CHANNEL_TIMEOUT",
  "MCA_MSGCH_PMREQ_CMP_TIMEOUT",
  "MCA_PKGC_DIRECT_WAKE_RING_TIMEOUT",
  "MCA_PKGC_INVALID_RSP_PCH",
  "MCA_PKGC_WATCHDOG_HANG_CBZ_DOWN",
  "MCA_PKGC_WATCHDOG_HANG_CBZ_UP",
  "MCA_PKGC_WATCHDOG_HANG_C3_UP_SF",
  "MCA_SVID_VCCIN_VR_ICC_MAX_FAILURE",
  "MCA_SVID_COMMAND_TIMEOUT",
  "MCA_SVID_VCCIN_VR_VOUT_FAILURE",
  "MCA_SVID_CPU_VR_CAPABILITY_ERROR",
  "MCA_SVID_CRITICAL_VR_FAILED",
  "MCA_SVID_SA_ITD_ERROR",
  "MCA_SVID_READ_REG_FAILED",
  "MCA_SVID_WRITE_REG_FAILED",
  "MCA_SVID_PKGC_INIT_FAILED",
  "MCA_SVID_PKGC_CONFIG_FAILED",
  "MCA_SVID_PKGC_REQUEST_FAILED",
  "MCA_SVID_IMON_REQUEST_FAILED",
  "MCA_SVID_ALERT_REQUEST_FAILED",
  "MCA_SVID_MCP_VR_ABSENT_OR_RAMP_ERROR",
  "MCA_SVID_UNEXPECTED_MCP_VR_DETECTED",
  "MCA_FIVR_CATAS_OVERVOL_FAULT",
  "MCA_FIVR_CATAS_OVERCUR_FAULT",
  "MCA_WATCHDOG_TIMEOUT_PKGC_SLAVE",
  "MCA_WATCHDOG_TIMEOUT_PKGC_MASTER",
  "MCA_WATCHDOG_TIMEOUT_PKGS_MASTER",
  "MCA_PKGS_CPD_UNCPD_TIMEOUT",
  "MCA_PKGS_INVALID_REQ_PCH",
  "MCA_PKGS_INVALID_REQ_INTERNAL",
  "MCA_PKGS_INVALID_RSP_INTERNAL",
  "MCA_PKGS_SMBUS_VPP_PAUSE_TIMEOUT",
  "MCA_RECOVERABLE_DIE_THERMAL_TOO_HOT"

At 504, a networking connectivity fault can trigger performance of recovery policy actions for a management interface based on fault type and severity. A local recovery controller can attempt to fall back to a secondary management interface and use non-failed physical port to talk to a management interface according to its configuration. The local recovery controller can be located on the same platform with a core or processors that run one or more services or different CPU or different server that includes a core or processors that run one or more services.

At 506, the local recovery controller can scan the local platform to see if any services are operational. For example, the local recovery controller can determine if the NFVI has any CPU faults or memory faults or which services are operational (e.g., still comply with SLA). Other examples of operational services can include infrastructure services such as virtual switch services/processes, monitoring and analytic services such as collectd/telegraf, node exporter, logging services such as syslog, Kubernetes and other VIM services/processes, or hypervisor services such as KVM. A service can be operational if the service is listed as an active process by an operating system. A list of services to be checked can be supplied to the recovery controller as part of a recovery policy.

As specified by a recovery policy, for essential platform (NFVI) networking services the status of the Ethernet link on specific ports is checked to see if network capability is available. A recovery controller can also check that the essential services listed are active in terms of generating I/O (network or storage) and not stalled. Determination of active services can be performed using Linux-based tools such as System V.

At 508, the local recovery controller can wait for management system (e.g., MANO) recovery to commence using a standby or original management system. Management system recovery can occur via 520 and 522, described below. For example, a determination is made if a standby or original management system is identified to the local recovery controller within a prescribed amount of time. For example, a determination can be made if a MANO kick-in is received in a prescribed amount of time. MANO kick-in can be an identification of a standby management system by the local recovery controller. The MANO kick-in can appear as a same system from a networking point of view to the local recovery controller but could be a different device. If a standby or original management system is identified to the local recovery controller within a prescribed amount of time (e.g., X seconds), then the process can continue to 510.

At 510, the local recovery controller can track a state of a services infrastructure and services and communicate such state to the identified management system. For example, the state of a services infrastructure and services can include states of respective NFVI platform and one or more VNFs and other services.

In some examples, the identified management system does not have to redeploy NFVI platform and VNF or other services if they are performant (e.g., complying with an applicable SLA) but can redeploy any non-operating or non-performant service. In some examples, an opportunity is provided to start-up services before attempting to redeploy the services unless the uptime is greater than the usual deployment time for the service. In some examples, the management system may not redeploy a service if it is not performant and allow it to continue. However, if a customer has paid for a particular level of SLA that has not been met, redeployment of the service may be preferred. In some examples, the identified management system can redeploy non-operating or non-performant services.

If a standby or original management system is not identified to the local recovery controller in a prescribed amount of time (e.g., X seconds), then at 530 and 532, the local recovery controller attempts to reconnect with the management system under failsafe mode. A failsafe mode can be service provider defined. A failsafe mode could be any of shutdown all ethernet ports except an authenticated, audited and encrypted interface until a connection from a known standby management is received, such as a secure shell (SSH) interface for a dedicated management recovery remediation entity. Another fail safe could include continue running all services but not allow any new services to be deployed until contact with an authenticated management entity is received.

At 520, management system recovery is attempted to recover the original management system or fall back to a standby management system. At 522, after management system recovery, the acting management system can request one or more recovery agents (e.g., remote recovery controller) to communicate with one or more local agents (e.g., local recovery controller) to indicate the management system is operational and the remote local recovery controller can send a heartbeat to the local recovery controller to indicate operation of the remote local recovery controller. At 522, the management system can send a query to one or more local recovery controllers to determine and/or provide an operating status of NFVI and VNFs or other services operating on the platform. The process can continue to 508.

Figure 6:
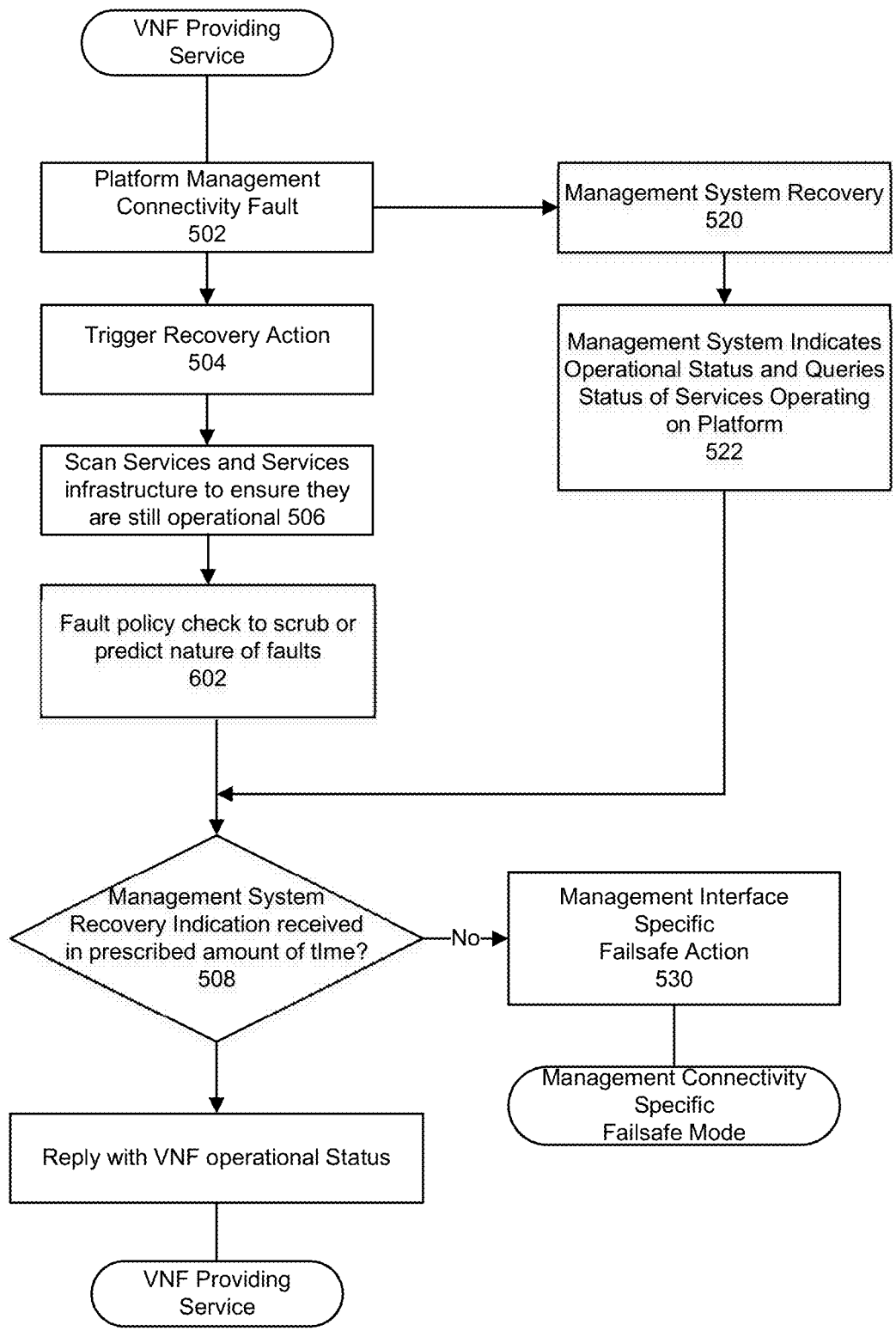
FIG. 6 depicts a process for a recovery check.

FIG. 6 depicts a process for recovery check. The recovery checks can be carried out by the local recovery controller in some embodiments. This process is similar to the process of FIG. 5 but can include a fault policy check at 602 for information of one or more of: Intel Architecture (or other processor system) counter values, faulty dual in-line memory module (DIMM) isolation, dynamic link width reduction, PCIe Stop and Scream control register settings, enhanced SMM (e.g., SMM operating mode provided for handling system-wide functions like power management, system hardware control), memory fault resilient booting, predictive failure analysis, check for central processing unit (CPU) faults, check for reliability, or check for serviceability. A sequence of checks can be governed by a recovery policy which can be per platform and per service, as some checks may be necessary in only some circumstances. The checked information can be provided to the active management system by the local recovery controller. In some examples, action 602 of FIG. 6 can include any portion of the checks of FIG. 7. In some examples, policy check information can be communicated to a management system by the local recovery controller. The management system can pass the information to a VNF lifecycle management or NFVI management components to process the data to determine a state of the platform during a connection outage and update analytics and telemetry relevant to the NFVI or the VNF. The management system can determine which services to re-deploy or permit to continue to operate based on the provided performance information from the local recovery agent.

Figure 7:
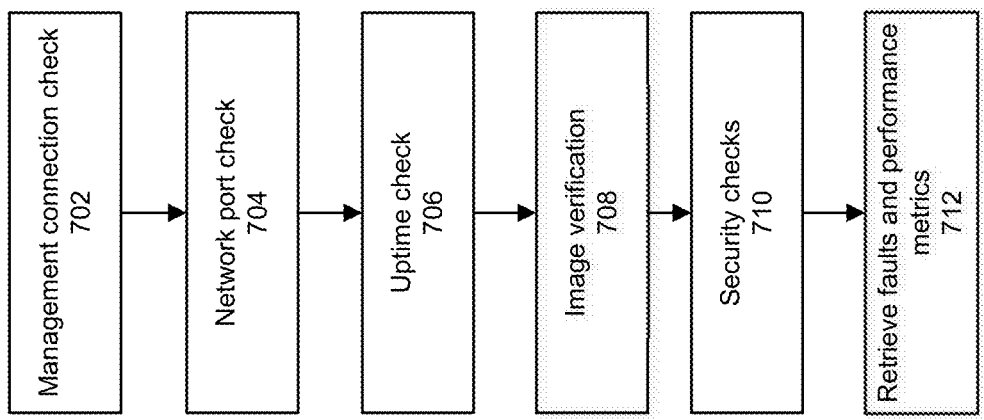
FIG. 7 shows an example of local recovery agent checks.

FIG. 7 shows an example of local recovery agent checks. For example, a connectivity outage between a management system and a platform or local recovery agent followed by restoration of connectivity (or use of alternate connectivity) can trigger performance of this process by a local recovery agent. At 702, a management connection check can occur whereby the local recovery agent checks if its connection with a management system is stable and makes sure connectivity is stable before attempting recovery, in case the management system fails again. At 704, a network port check can be performed whereby a check is made for a minimum number of ports and if any port is damaged during the outage. At 706, an uptime check can occur whereby a local recovery agent checks uptime of services and gives services an opportunity to start-up before attempting to redeploy any service unless the uptime is greater than the usual deployment time for the service. A configuration and crash log for the service can be reset. At 706, a fault check can be performed by a local recovery agent whereby a check is made of the Field Replaceable Units (FRUs) for faults logged. Fault data can be obtained via proprietary interfaces to firmware for visibility into reliability features like faulty dual in-line memory module (DIMM) isolation, dynamic link width reduction, PCIe Stop and Scream control register settings, enhanced SMM, memory fault resilient booting, predictive failure analysis and so forth.

At 708, image verification can be performed that includes checks for the software version installed on the managed platform. Checks of the software version can include checks of key operating system (OS) services, hypervisor and VNF state, container state (e.g., docker images), or other actions. At 710, security checks can be performed to determine media access control (MAC) address or other packet headers of packets received by the managed platform are from a list of valid IP sources provided in the policy. These checks can be configured using IP filters in a virtual switch or network interface controller (NIC). At 712, faults and performance metrics can be retrieved from a managed platform by the local recovery agent. The local recovery agent can check for faults and relevant metrics to determine what caused the faults in the managed system. Information gathered using the process of FIG. 7 can be provided to a management system by the local recovery controller. A management system can determine which services to re-deploy or permit to continue to operate based on the provided performance monitoring from the local recovery agent.

Figure 8:
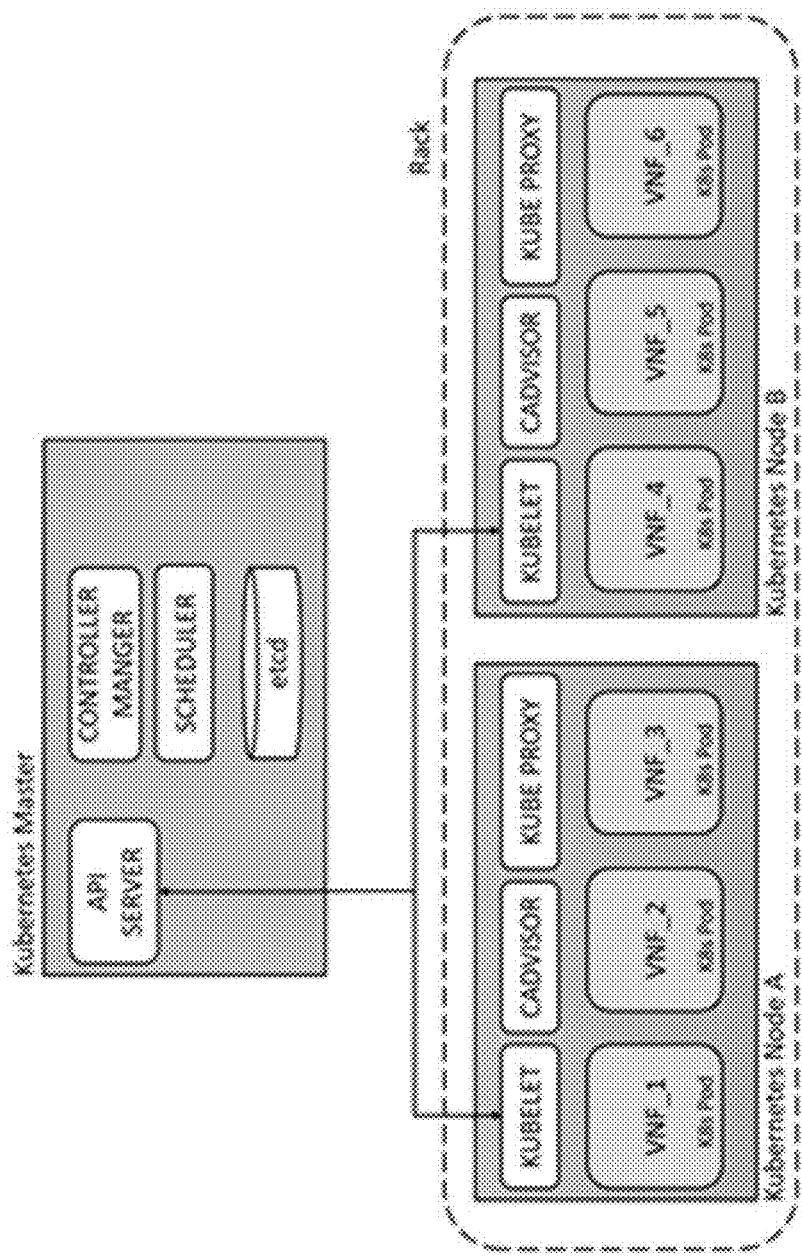
FIGS. 8 and 9 show a Kubernetes cluster with a Main node and two nodes running VNFs.
Figure 9:
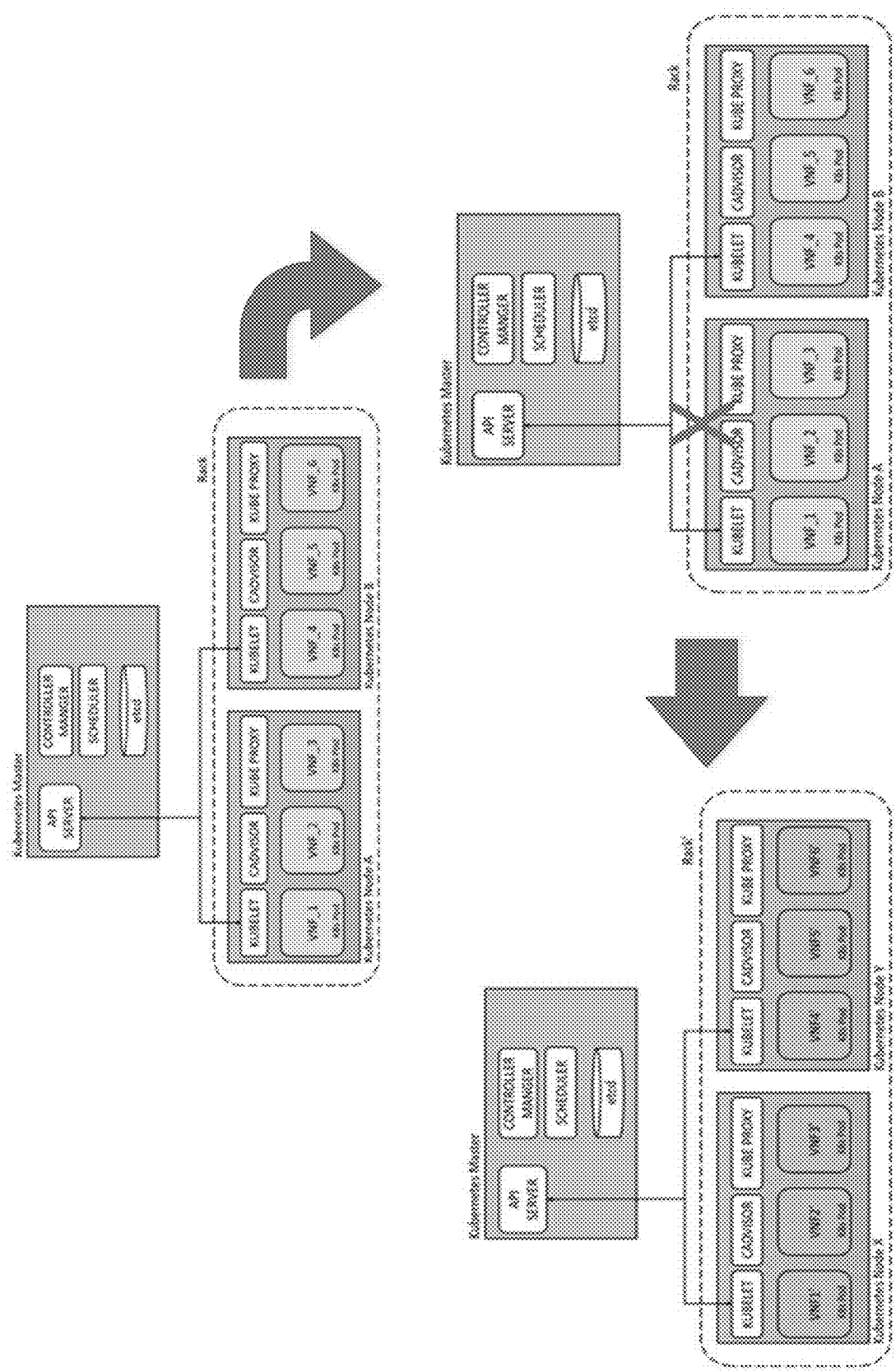

FIGS. 8 and 9 show a Kubernetes cluster with a Main node and two nodes running VNFs. If a connection is lost from the API Main to the Nodes, when the connection is restored all the VNFs are redeployed. Kubernetes redeploys not just the VNFs but all the services as well. Integrating the resiliency controller with the Kubernetes Main and having a resiliency node agent and using embodiments described herein at least with respect to FIGS. 2A and 5-7 can allow for the VNFs and nodes can provide continued service without interruption (assuming all the necessary checks have passed) by selectively re-deploying non-performant services (e.g., failure to meet applicable SLAs) but allowing performant services (e.g., services whose performance meet applicable SLAs) to continue operation without re-deployment.

Figure 10:
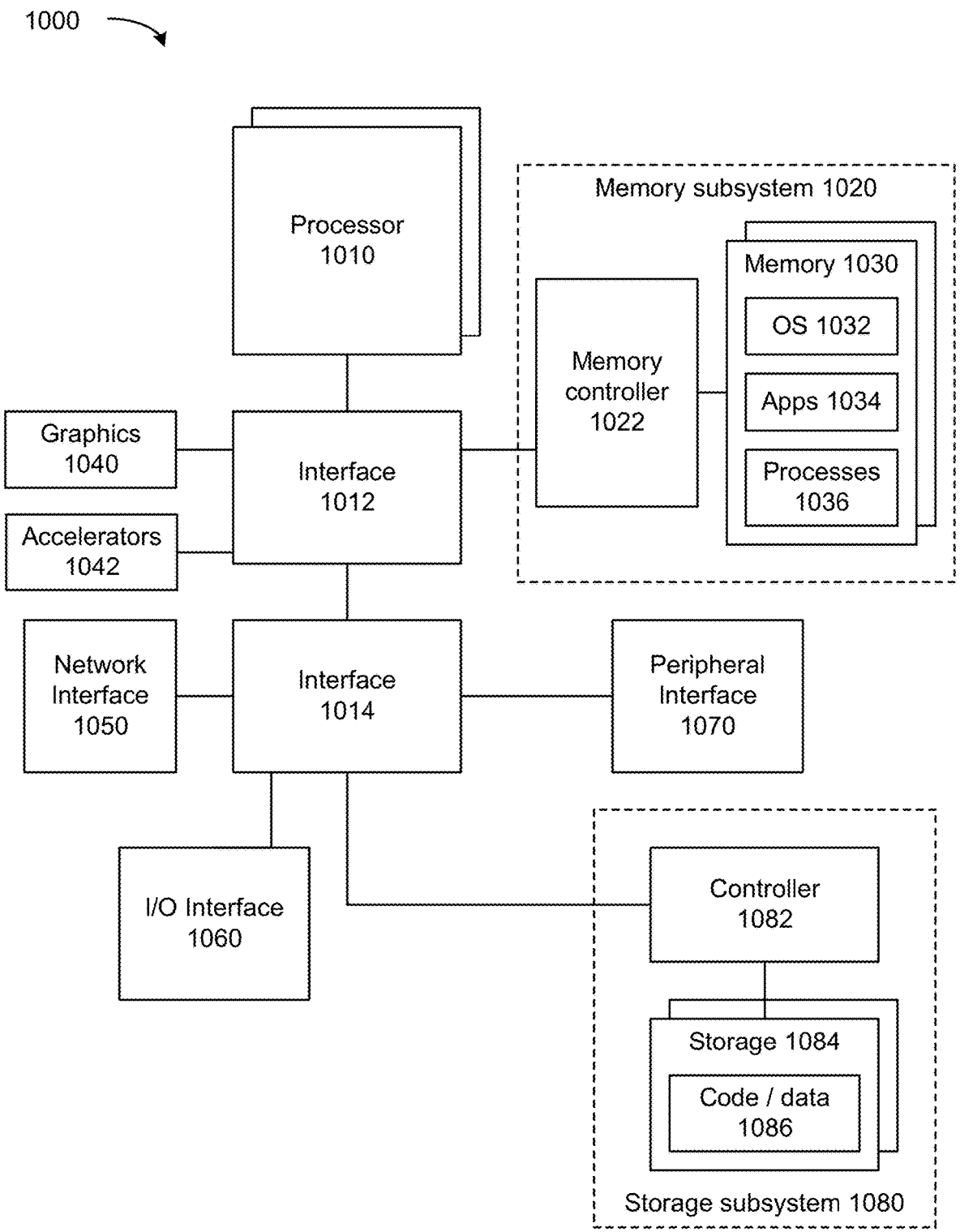
FIG. 10 depicts an example system.

FIG. 10 depicts a system. The system can use embodiments described herein to monitor services and selectively redeploy services in response to a connection loss with a management system in accordance with embodiments described herein. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function offload engine that can be accessed or used by a processor 1010. Accelerators 1042 can be coupled to processor 1010 using a memory interface (e.g., DDR4 and DDR5) or using any networking or connection standard described herein. For example, an accelerator among accelerators 1042 can provide sequential and speculative decoding operations in a manner described herein, compression (DC) capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

In some examples, processor 1010 can execute a device driver (not depicted) for network interface 1050. OS 1032 can determine capabilities of network interface 1050 from the device driver. For example, OS 1032 can receive an indication of capabilities of network interface 1050 to perform one or more of the following capabilities or capabilities described herein: link training time extension, commencing link training earlier than scheduled, changing or setting a default link training time, link re-training, or component parameter modification. OS 1032 can request the device driver to enable or disable network interface 1050 to perform any of the capabilities described herein. In some examples, OS 1032, itself, can enable or disable network interface 1050 to perform any of the capabilities described herein. OS 1032 can provide requests (e.g., from an application 1034) to network interface 1050 to utilize one or more capabilities of network interface 1050. For example, any of applications 1034 can request use or non-use of any capabilities described herein by network interface 1050. In some examples, a datacenter administrator can configure network interface 1050 to perform any of the capabilities described herein.

Any processor can use a shared resource environment. A shared resource environment can include a virtual machine or a container. A virtual machine can be software that runs an operating system and one or more applications. A virtual machine can be defined by specification, configuration files, virtual disk file, non-volatile random access memory (NVRAM) setting file, and the log file and is backed by the physical resources of a host computing platform. A container can be a software package of applications, configurations and dependencies so the applications run reliably on one computing environment to another. Containers can share an operating system installed on the server platform and run as isolated processes.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 1050 can receive data from a remote device, which can include storing received data into memory. Various embodiments can be used in connection with network interface 1050, processor 1010, and memory subsystem 1020.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (e.g., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (e.g., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A volatile memory is memory whose state (and therefore the data stored in it) is indeterminate if power is interrupted to the device. Dynamic volatile memory can involve refreshing the data stored in the device to maintain state. One example of dynamic volatile memory incudes DRAM (Dynamic Random Access Memory), or some variant such as Synchronous DRAM (SDRAM). An example of a volatile memory includes a cache. A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects between components can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Any processor can use a shared resource environment. A shared resource environment can include a virtual machine or a container. A virtual machine can be software that runs an operating system and one or more applications. A virtual machine can be defined by specification, configuration files, virtual disk file, non-volatile random access memory (NVRAM) setting file, and the log file and is backed by the physical resources of a host computing platform. A container can be a software package of applications, configurations and dependencies so the applications run reliably on one computing environment to another. Containers can share an operating system installed on the server platform and run as isolated processes.

In some examples, embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

For example, various embodiments can be used for wired or wireless protocols (e.g., 3GPP Long Term Evolution (LTE) (4G) or 3GPP 5G), on-premises data centers, off-premises data centers, base station devices, sensor data sender or receiver devices (e.g., for autonomous vehicles or augmented reality applications), endpoint devices, servers, routers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 11:
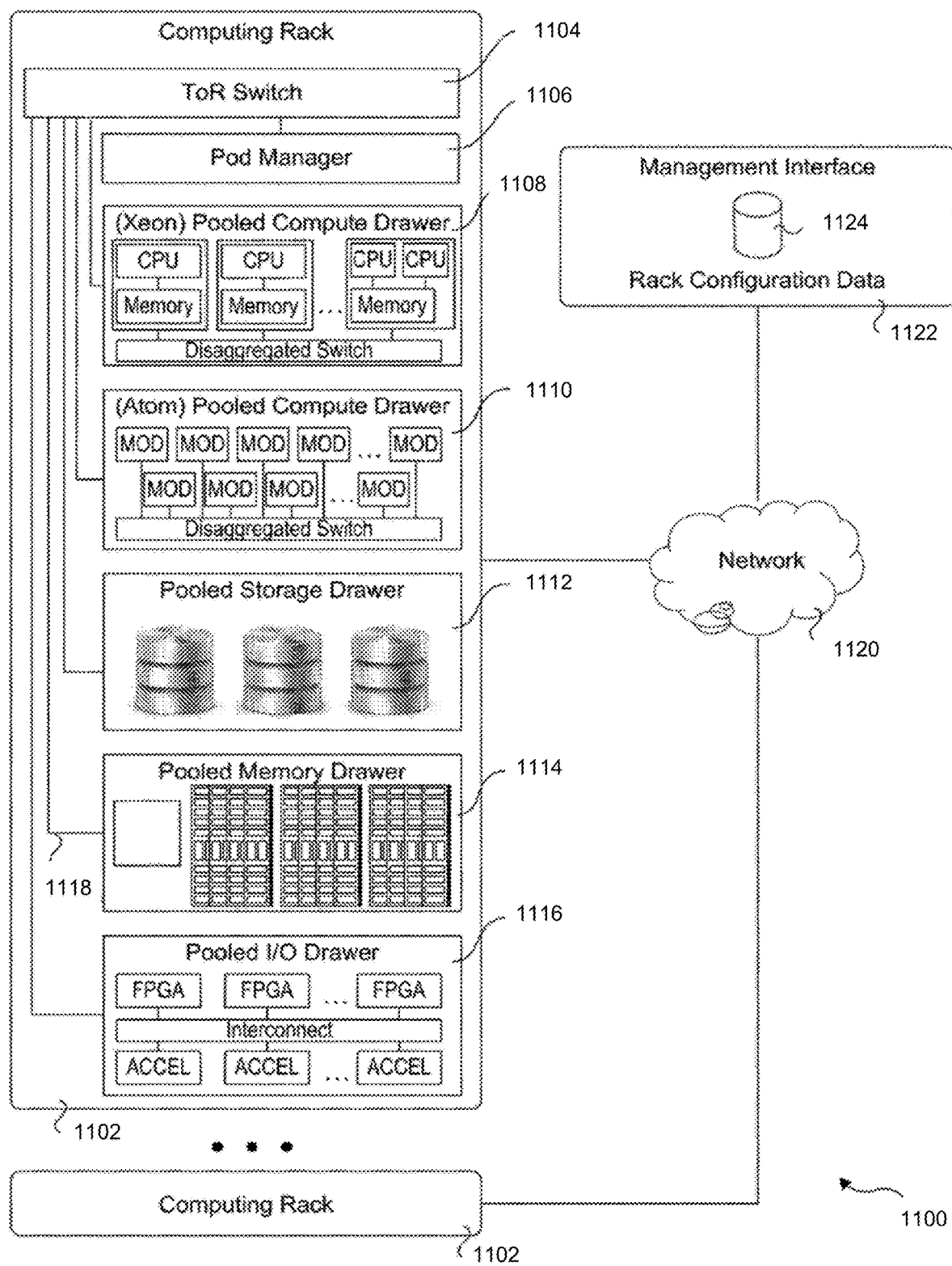
FIG. 11 depicts an environment.

FIG. 11 depicts an environment 1100 includes multiple computing racks 1102, some including a Top of Rack (ToR) switch 1104, a pod manager 1106, and a plurality of pooled system drawers. Various embodiments can be used by embodiments described herein at least in connection with monitoring of services and selective redeployment of services in response to a connection loss with a management system. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1108, and Intel® ATOM™ pooled compute drawer 1110, a pooled storage drawer 1112, a pooled memory drawer 1114, and a pooled I/O drawer 1116. Some of the pooled system drawers is connected to ToR switch 1104 via a high-speed link 1118, such as a 40 Gigabit/second (Gb/s) or 100 Gb/s Ethernet link or a 100+Gb/s Silicon Photonics (SiPh) optical link. In one embodiment high-speed link 1118 comprises an 800 Gb/s SiPh optical link.

Multiple of the computing racks 1102 may be interconnected via their ToR switches 1104 (e.g., to a pod-level switch or data center switch), as illustrated by connections to a network 1120. In some embodiments, groups of computing racks 1102 are managed as separate pods via pod manager(s) 1106. In one embodiment, a single pod manager is used to manage racks in the pod. Alternatively, distributed pod managers may be used for pod management operations.

Environment 1100 further includes a management interface 1122 that is used to manage various aspects of the environment. This includes managing rack configuration, with corresponding parameters stored as rack configuration data 1124.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a non-transitory computer-readable medium comprising instructions stored thereon, that if executed by one or more processors, cause the one or more processors to: monitor activity of a services infrastructure and services executed by the at least one processor and based on failure of a connection with the management system and subsequent connection with the management system, provide monitored activity of the services infrastructure and services to the management system to identify services that are candidates for re-deployment.

Example 2 includes any example, wherein the failure to maintain a connection with a management system comprises failure to receive a keep alive indication.

Example 3 includes any example, and includes instructions stored thereon, that if executed by one or more processors, cause the one or more processors to: based on failure of recovery of connection with the management system, utilize a secondary management interface to communicate with the management system.

Example 4 includes any example, wherein: the services infrastructure comprises a Network Functions Virtualization Infrastructure (NFVI) and the services comprise at least one Virtual Network Function (VNF).

Example 5 includes any example, wherein: the monitor activity of a services infrastructure and services executed by the at least one processor comprises obtain fault data of a computing platform.

Example 6 includes any example, wherein the fault data comprises one or more of: processor performance counter values, faulty dual in-line memory module (DIMM) isolation, dynamic link width reduction, Peripheral Component Interconnect express (PCIe) Stop and Scream control register settings, memory fault resilient booting, predictive failure analysis, or check for central processing unit (CPU) faults.

Example 7 includes any example, wherein: monitor activity of a services infrastructure and services executed by the at least one processor comprises determine if any service fails to achieve associated service level agreement (SLA) performance and provide monitored activity of the services infrastructure and services to the management system comprises indicate which service is not complying with its SLA.

Example 8 includes any example, wherein the management system is to redeploy a service that is not complying with its SLA.

Example 9 includes any example, comprising instructions stored thereon, that if executed by one or more processors, cause the one or more processors to: receive indication of a standby management system to connect with and attempt to connect with the standby management system.

Example 10 includes any example, wherein the management system and standby management system are compatible with European Telecommunications Standards Institute (ETSI) Open Source NFV Management and Orchestration (MANO), Kubernetes, OpenStack, or Network Function Virtualization (NFV) orchestrator.

Example 11 includes any example, wherein the management system comprises a virtualized infrastructure manager (VIM) and the standby management system comprises a VIM.

Example 12 includes any example, and includes a method comprising: receiving a configuration for operation during a failure of connectivity with a management system; monitoring activity of one or more services; and based on failure of connectivity with the management system and recovery of connectivity with the management system, providing the monitored activity of one or more services to the management system to influence services re-deployed by the management system.

Example 13 includes any example, wherein the receiving a configuration for operation during a failure of connectivity with a management system comprises receiving an indication of actions to perform and service level agreement (SLA) performance requirements for the one or more services.

Example 14 includes any example, and includes based on failure to re-establish a connection with the management system within an amount of time, connecting with the management system using a secondary management interface.

Example 15 includes any example, wherein the one or more services comprise at least one Virtual Network Function (VNF).

Example 16 includes any example, and includes providing fault data to the management system in response to re-establishment of a connectivity with the management system within an amount of time.

Example 17 includes any example, wherein the monitoring activity of one or more services comprises determining if any of the one or more services fail to achieve associated service level agreement (SLA) performance.

Example 18 includes any example, and includes a computing system comprising: at least one processor and at least one memory device, wherein at least one processor is to: monitor activity of a services infrastructure and services executed by the at least one processor and based on a failure to maintain a connection with a management system and recovery of connection with the management system, perform monitored activity of the services infrastructure and services to the management system to identify services that are candidates for re-deployment.

Example 19 includes any example, and includes based on failure of recovery of connection with the management system, access a secondary management interface to communicate with the management system.

Example 20 includes any example, and includes a network interface, switch, edge node, base station, server, rack, or data center.

Example 21 includes any example, and includes a non-transitory computer-readable medium comprising instructions stored thereon, that if executed by one or more processors, cause the one or more processors to: perform a management service that is to: in response to a failed connection with a platform that executes one or more services and subsequent re-connection with the platform: determine and indicate which service to redeploy on the platform based on service performance monitored by the platform.

Example 22 includes any example, wherein the service performance monitored by the platform comprises one or more of: processor performance counter values, faulty dual in-line memory module (DIMM) isolation, dynamic link width reduction, Peripheral Component Interconnect express (PCIe) Stop and Scream control register settings, memory fault resilient booting, predictive failure analysis, or check for central processing unit (CPU) faults.

Example 23 includes any example, wherein determine which service to redeploy on the platform based on service performance monitored by the platform comprises determine if the service fails to achieve associated service level agreement (SLA) performance.

Example 24 includes any example, wherein the management system is compatible with European Telecommunications Standards Institute (ETSI) Open Source NFV Management and Orchestration (MANO), Kubernetes, OpenStack, or Network Function Virtualization (NFV) orchestrator.

What is claimed is:

1. At least one non-transitory computer-readable medium comprising instructions stored thereon, that if executed by one or more processors, cause the one or more processors to:
   monitor activity of a services infrastructure and services executed by at least one processor and
   based on failure of a connection with a management system and subsequent connection with the management system, provide monitored activity of the services infrastructure and services to the management system to identify services that are candidates for re-deployment.

2. The non-transitory computer-readable medium of claim 1, wherein the failure of the connection with the management system comprises failure to receive a keep alive indication.

3. The non-transitory computer-readable medium of claim 1, comprising instructions stored thereon, that if executed by one or more processors, cause the one or more processors to:
   based on failure of recovery of connection with the management system, utilize a secondary management interface to communicate with the management system.

4. The non-transitory computer-readable medium of claim 1, wherein:
   the services infrastructure comprises a Network Functions Virtualization Infrastructure (NFVI) and the services comprise at least one Virtual Network Function (VNF).

5. The non-transitory computer-readable medium of claim 1, wherein:
   the monitor activity of the services infrastructure and services executed by the at least one processor comprises obtain fault data of a computing platform.

6. The non-transitory computer-readable medium of claim 5, wherein the fault data comprises one or more of: processor performance counter values, faulty dual in-line memory module (DIMM) isolation, dynamic link width reduction, Peripheral Component Interconnect express (PCIe) Stop and Scream control register settings, memory fault resilient booting, predictive failure analysis, or check for central processing unit (CPU) faults.

7. The non-transitory computer-readable medium of claim 1, wherein:
   the monitor activity of the services infrastructure and services executed by the at least one processor comprises determine if any service fails to achieve associated service level agreement (SLA) performance and
   provide monitored activity of the services infrastructure and services to the management system comprises indicate which service is not complying with its SLA.

8. The non-transitory computer-readable medium of claim 7, wherein the management system is to redeploy a service that is not complying with its SLA.

9. The non-transitory computer-readable medium of claim 1, comprising instructions stored thereon, that if executed by the one or more processors, cause the one or more processors to:
   receive indication of a standby management system to connect with and
   attempt to connect with the standby management system.

10. The non-transitory computer-readable medium of claim 9, wherein the management system and standby management system are compatible with European Telecommunications Standards Institute (ETSI) Open Source NFV Management and Orchestration (MANO), Kubernetes, OpenStack, or Network Function Virtualization (NFV) orchestrator.

11. The non-transitory computer-readable medium of claim 9, wherein the management system comprises a virtualized infrastructure manager (VIM) and the standby management system comprises a VIM.

12. A method comprising:
   receiving a configuration for operation during a failure of connectivity with a management system;
   monitoring activity of one or more services; and
   based on failure of connectivity with the management system and recovery of connectivity with the management system, providing the monitored activity of one or more services to the management system to influence services re-deployed by the management system.

13. The method of claim 12, wherein the receiving a configuration for operation during a failure of connectivity with a management system comprises receiving an indication of actions to perform and service level agreement (SLA) performance requirements for the one or more services.

14. The method of claim 12, comprising:
   based on failure to re-establish a connection with the management system within an amount of time, connecting with the management system using a secondary management interface.

15. The method of claim 12, wherein the one or more services comprise at least one Virtual Network Function (VNF).

16. The method of claim 12, comprising:
   providing fault data to the management system in response to re-establishment of a connectivity with the management system within an amount of time.

17. The method of claim 12, wherein the monitoring activity of one or more services comprises determining if at least one of the one or more services fail to achieve associated service level agreement (SLA) performance.

18. A computing system comprising:
   at least one processor and at least one memory device, wherein at least one processor is to:
monitor activity of a services infrastructure and services executed by the at least one processor and
based on a failure to maintain a connection with a management system and recovery of connection with the management system, provide the monitored activity of the services infrastructure and services to the management system to identify services that are candidates for re-deployment.

19. The computing system of claim 18, comprising:
based on failure of recovery of connection with the management system, access a secondary management interface to communicate with the management system.

20. The computing system of claim 18, comprising a network interface, switch, edge node, base station, server, rack, or data center.

21. A non-transitory computer-readable medium comprising instructions stored thereon, that if executed by one or more processors, cause the one or more processors to:
perform a management service that is to:
in response to a failed connection with a platform that executes one or more services and subsequent re-connection with the platform:
determine and indicate which service to redeploy on the platform based on service performance monitored by the platform.

22. The non-transitory computer-readable medium of claim 21, wherein the service performance monitored by the platform comprises one or more of: processor performance counter values, faulty dual in-line memory module (DIMM) isolation, dynamic link width reduction, Peripheral Component Interconnect express (PCIe) Stop and Scream control register settings, memory fault resilient booting, predictive failure analysis, or check for central processing unit (CPU) faults.

23. The non-transitory computer-readable medium of claim 21, wherein determine which service to redeploy on the platform based on service performance monitored by the platform comprises determine if the service fails to achieve associated service level agreement (SLA) performance.

24. The non-transitory computer-readable medium of claim 21, wherein the management service is compatible with European Telecommunications Standards Institute (ETSI) Open Source NFV Management and Orchestration (MANO), Kubernetes, OpenStack, or Network Function Virtualization (NFV) orchestrator.

25. The non-transitory computer-readable medium of claim 1, comprising instructions stored thereon, that if executed by one or more processors, cause the one or more processors to:
based on the monitored activity of the services infrastructure and services to the management system, identify a service that is not to be re-deployed.

26. The method of claim 12, comprising:
based on the monitored activity of one or more services to the management system, identifying services that is not to be re-deployed.

27. The computing system of claim 18, wherein:
the at least one processor is to:
based on the monitor activity of a services infrastructure and services executed by the at least one processor, identify a service that is not to be re-deployed.

28. The non-transitory computer-readable medium of claim 21, comprising instructions stored thereon, that if executed by one or more processors, cause the one or more processors to:
based on the service performance monitored by the platform, identify a service that is not to be re-deployed.

* * * * *